(12) United States Patent
Rostami

(10) Patent No.: US 11,205,354 B2
(45) Date of Patent: Dec. 21, 2021

(54) THREE DIMENSIONAL SHAPE MADE FROM A SHEET

(71) Applicant: Sylvia Tatevosian Rostami, Tarzana, CA (US)

(72) Inventor: Sylvia Tatevosian Rostami, Tarzana, CA (US)

( * ) Notice: Subject to any disclaimer, the term of this patent is extended or adjusted under 35 U.S.C. 154(b) by 0 days.

(21) Appl. No.: 16/799,845

(22) Filed: Feb. 25, 2020

(65) Prior Publication Data
US 2020/0273374 A1    Aug. 27, 2020

Related U.S. Application Data

(60) Provisional application No. 62/809,925, filed on Feb. 25, 2019.

(51) Int. Cl.
*G09B 27/08*   (2006.01)
*G09B 27/06*   (2006.01)

(52) U.S. Cl.
CPC .............. *G09B 27/08* (2013.01); *G09B 27/06* (2013.01)

(58) Field of Classification Search
None
See application file for complete search history.

(56) References Cited

U.S. PATENT DOCUMENTS

| | | | | |
|---|---|---|---|---|
| 5,222,802 A | * | 6/1993 | Beck | F21V 1/06 206/457 |
| 6,878,422 B1 | * | 4/2005 | Spaar | B44C 5/00 40/617 |
| 2008/0286499 A1 | * | 11/2008 | Spaar | G09F 1/08 428/9 |

* cited by examiner

*Primary Examiner* — James B Hull

(57) ABSTRACT

An apparatus comprised of flexible gores that are serially connected to each other at their lateral adjoining edges. These gores have a hole in their polar region and a drawstring runs through the gores' holes such that, when the drawstring is pulled, the drawstring pulls the gores' polar regions together and a radial three dimensional shape forms.

20 Claims, 5 Drawing Sheets

THREE DIMENSIONAL SHAPE MADE FROM A SHEET

BRIEF SUMMARY OF THE INVENTION

This invention provides for an apparatus that can transform from a flat sheet into a three dimensional shape. It is comprised of flexible gores and segments that are serially connected to each other. These gores and segments have a hole in their polar region and a drawstring runs through the gores' holes such that, when the drawstring is pulled, the drawstring pulls the gores' polar regions together and a radial three dimensional shape forms. Many variations of this invention are possible and will be discussed in further detail below. Thus, this apparatus can be adapted into all manner of products, including Holiday ornaments and all other types of decor, lighting fixtures, and packaging. This apparatus is superior to its prior art for a number of reasons. First, the manufacturing and threading of a single sheet requires significantly less steps of work and time than the manufacturing of an umbrella globe or individually attached gores. A sheet can take up nearly no space, and the continuous connection between gores provides added structure and form to the resulting three dimensional space. The stacking of the segment poles at the poles of the three dimensional shape provides further structure to better approximate the targeted shape. In addition, the pulling of a drawstring is a very easy, yet effective method of forming the shape.

BRIEF DESCRIPTION OF THE DRAWING

This invention can be better understood via the following drawings and their descriptions.

MODES FOR CARRYING OUT THE INVENTION

Figure 1:
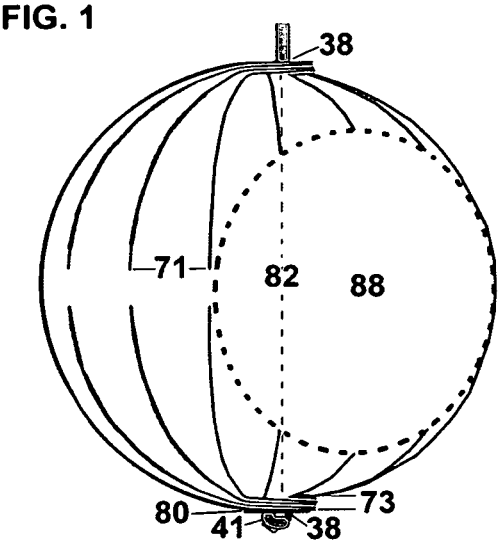
FIG. 1 illustrates a spheroidal cap shape which has formed from the flat apparatus illustrated in FIG. 3.
Figure 2:
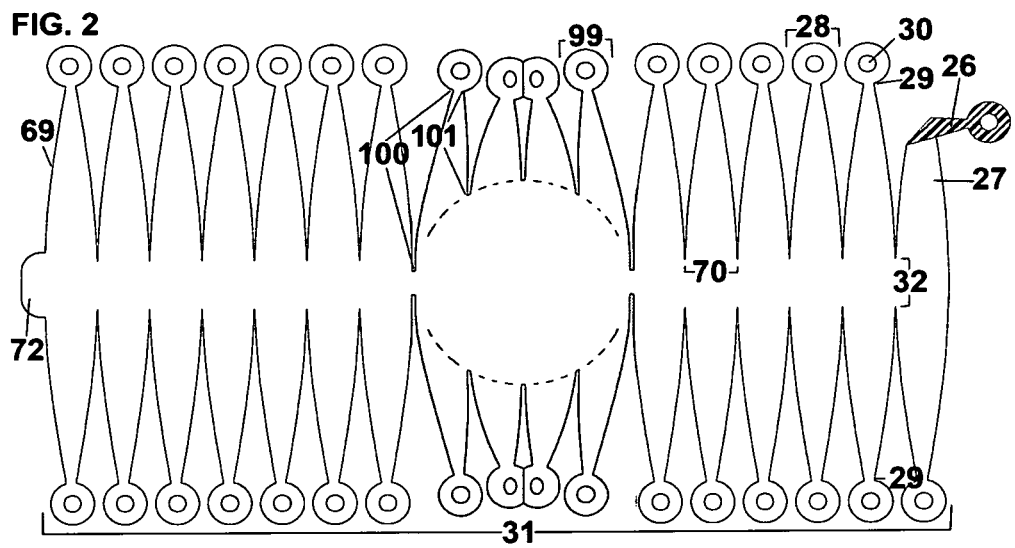
FIG. 2 illustrates a sheet with its plane section, numerous segments and gores, and a tab which, after being threaded and pulled, will approximate the spheroidal cap shape in FIG. 1.
Figure 3:
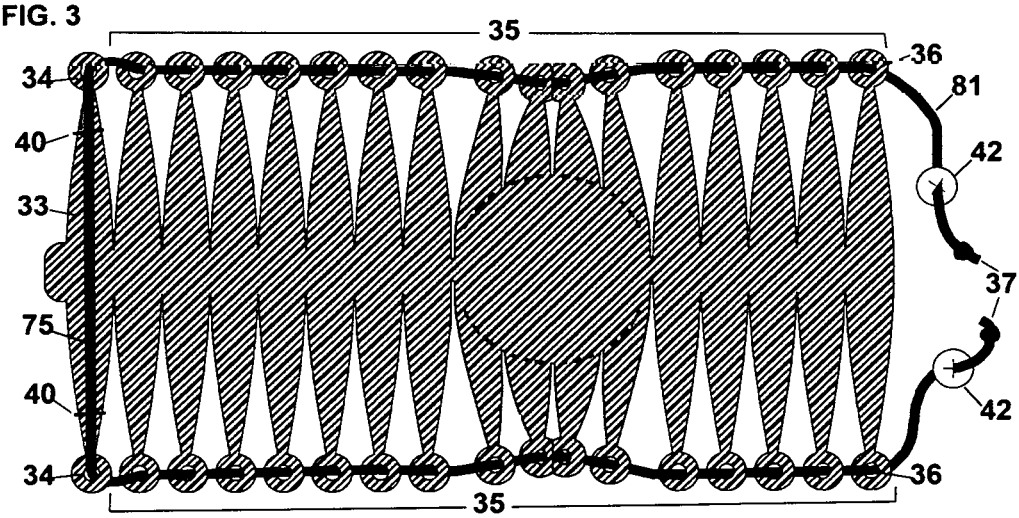
FIG. 3 illustrates one embodiment of the spheroidal cap shape apparatus in its flat state, after it has been threaded, two stoppers have been placed on its drawstring, and knots have been tied at the drawstring's ends. This drawing also illustrates the preferred directionality of the threading of the apparatus. Once this embodiment's drawstring is pulled, it will transform into the spheroidal cap shape in FIG. 1.
Figure 13:
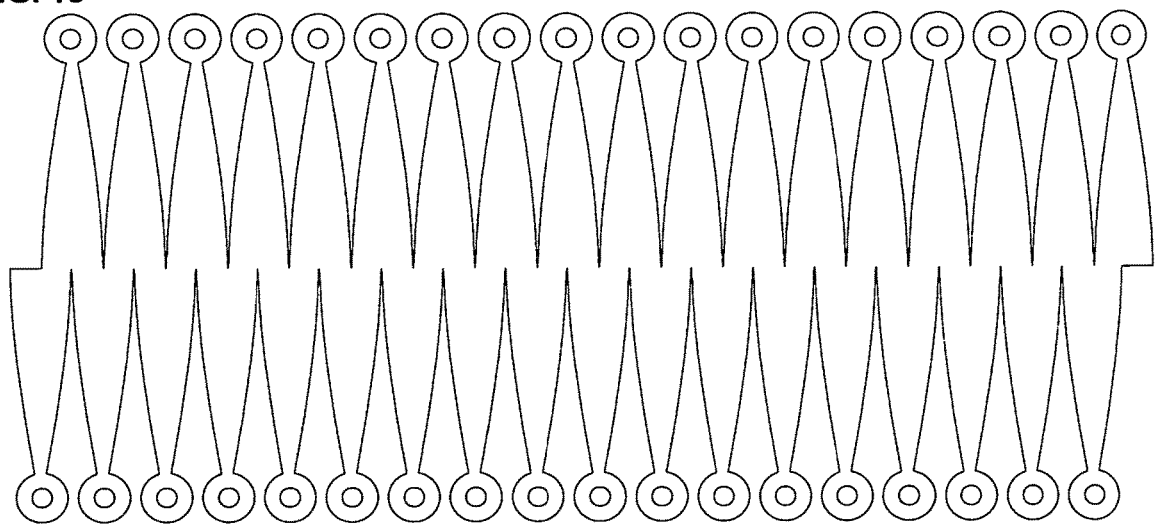
FIG. 13 illustrates the cut of a sheet where the segments of the upper hemisphere segment series are offset and staggered relative to the segments of the lower hemisphere segment series.

This invention pertains to the method for creating a three dimensional shape, for example FIG. 1 from preferably a flat sheet (FIG. 2). Said sheet has an inner face (FIG. 2, 26), and an outer face (FIG. 2, 27). It is comprised of multiple gores (FIG. 2, 28), or segments (FIG. 2, 99), each of which can taper at its distal poles (FIG. 2, 29). At a plurality of these poles are located holes (FIG. 2, 30). These gores, or segments are made to serially be lined up next to each other (FIG. 2, 31), and can be either connected at their lateral edges (FIG. 2, 32), or by having the top and bottom segments staggered relative to one another (FIG. 13). Gores can be cut separately and then connected at their lateral edges. Alternatively, when made on one flat sheet, the sheet can be cut such that, at the abutting area between two adjacent gores, no cut is ever made, and thus, the gores are already created joined together from only one sheet. A drawstring is threaded sequentially and unidirectionally through the consecutive holes (FIG. 3). At the first of the connected gores (FIG. 3, 33), the drawstring is threaded such as to go through both of the gores' opposite polar holes entering from the inner face of the sheet (FIG. 3, 34), towards the outside face. With the remaining adjacent gores, the drawstring is always threaded in the same direction as the first gore on each polar side of the joined gores (FIG. 3, 35). Thus, on each polar side, a stitch should never alternate in direction of entry between the faces of the sheet. After the last gore's segments' threading (FIG. 3, 36), both ends of the drawstring end at enough of a distance away from the last gore's two holes such as to prevent them from accidently becoming un-threaded (FIG. 3, 37). Threading the holes of the gores can be achieved in any order, and by any means, manually or automated, so long as the resulting threading has the above stated directionality and specifications.

Figure 4:
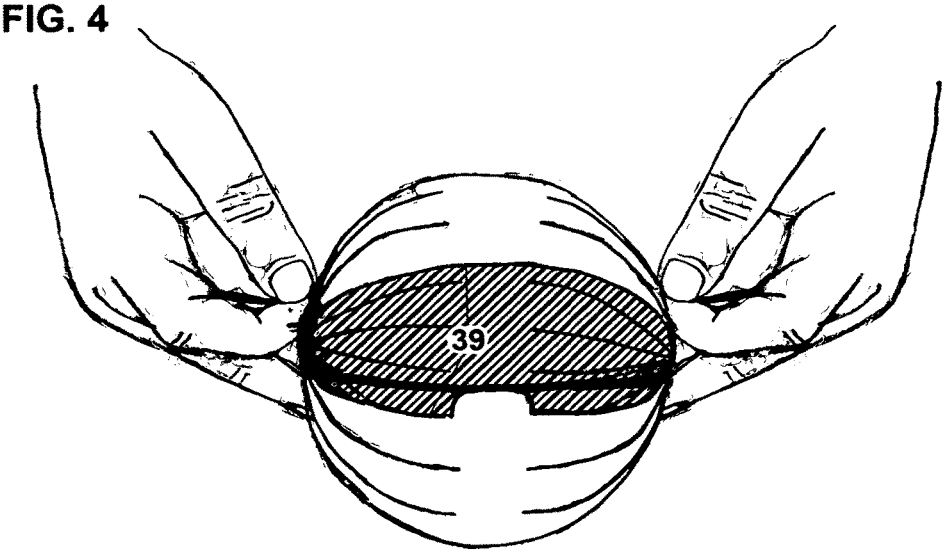
FIG. 4 illustrates the apparatus in FIG. 3 being partially transformed into the three dimensional shape of FIG. 1 as its drawstrings are being pulled.

Once the apparatus is thus created (FIG. 3), it can be made to take on a three dimensional shape when preferably both drawstrings are pulled at the same time (FIG. 4). The pulling of the drawstring, as with a drawstring pouch, causes the gores' and segments' poles to be drawn together to two polar points on the three dimensional shape that is forming (FIG. 1, 38). This in turn causes the sheet to curl across gores (FIG. 4), leaving the inner face of the sheet inside the curl, and the outer face outside the curl. It also causes the gores to curl in the perpendicular direction as well (FIG. 4). This perpendicular curling causes the polar hole regions and the imaginary planes that run across them to stack on top of each other.

To prevent the opposite poles from eventually being drawn too close to each other in this curling, multiple solutions exist. Visually, one can observe the formation of the three dimensional shape, and stop pulling the drawstrings once the first and last gores or segments have touched one another (FIG. 4, 39). Visually, one can also gauge how much to pull the drawstring until the desired three dimensional shape is achieved. Or a drawstring securing mechanism can be used such as knots or other stoppers that cannot pass through the polar holes at two points near the center of the drawstring where the shape's minimum axis height is allowable (FIG. 3, 40), thus preventing the drawstring from being pulled any further than these two points. When the three dimensional shape is complete (FIG. 1), the drawstring is running substantially through the axis of the three dimensional shape.

To prevent the three dimensional shape from unraveling back into a sheet, once the desired shape has been achieved, the drawstring can be secured and prevented from un-drawing with at least one drawstring securing mechanism, or in other words a stopper. Such stoppers can include, but are not limited to knots, clips, tabs (FIG. 3, 42), or recoiling springs. When the three dimensional shape needs to be made flat again, the drawstring securing mechanisms can be removed or pulled to the ends of the drawstring, and the sheet flattened out again.

Once the three dimensional shape is fully formed, the drawstring's two ends will be extending out of both poles of the three dimensional shape. There are multiple ways to reduce their visibility. They include, but are not limited to doing one or multiple of the following steps: winding the loose drawstring in any manner and/or attaching it to the exterior or interior of the three dimensional shape, or tucking the drawstring into the now formed interior cavity of the three dimensional shape. The drawstring can also be pulled through the axis of the three dimensional shape until one end of the drawstring reaches its corresponding pole (FIG. 1, 41). The drawstring that is now loose at the opposite pole of the three dimensional shape can either be made less visible through the various techniques discussed earlier, or can have a functional use like hanging, etc.

The numerous embodiments of this apparatus include Holiday ornaments and all other types of decor, lighting fixtures, and packaging.

Definitions

The following are definitions and clarifications of terms used in the claims and specifications.

Gore: A gore (FIG. 2, 28) is a panel of flexible material that can be composed of any substance that has sufficient rigidity to hold the desired shape, and simultaneously has enough flexibility to be curved or bent to form one three dimensional panel sector of a three dimensional shape. Such materials include, but are not limited to paper, cardstock, plastic sheets, metal sheets, and rigid fabrics. A gore should preferably be thin enough so that, at the space of the poles of the resulting three dimensional shape, there is not too thick of a stack of pole sheets that forms (FIG. 1, 73). A gore is of the shape such as to be adapted to be serially connected at its lateral edges (FIG. 6, 48) to adjacent gores.

Figure 5:
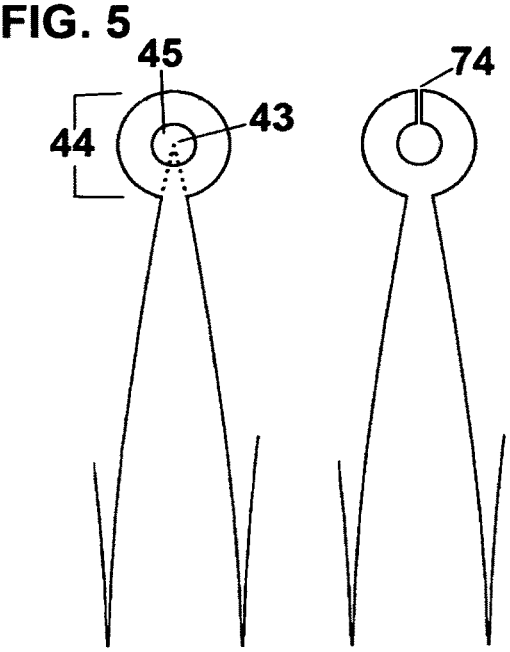
FIG. 5 illustrates a detailed drawing of one embodiment of a polar hole being closed off on all sides (left), versus a polar hole having an opening (right).
Figure 6:
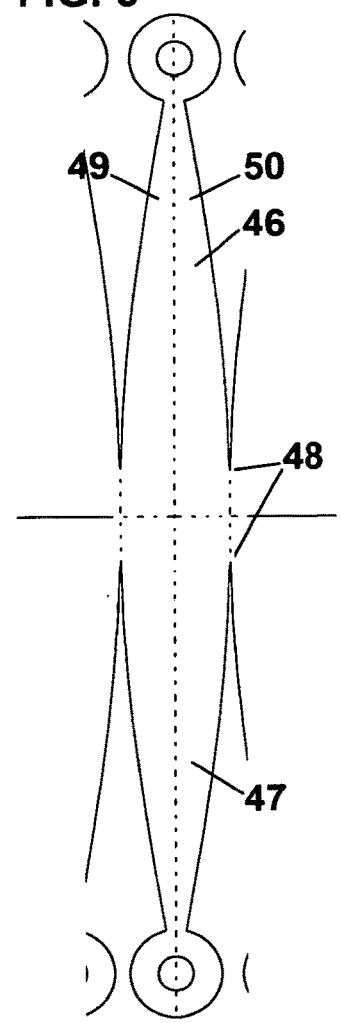
FIG. 6 illustrates a detailed drawing of one gore, its two segments, and its four quadrants.

A gore can have a hole in at least one of its poles that may optionally have a drawstring running through it (FIG. 5, 45). A gore can also have no hole in at least one of its poles, such that, in the resulting three dimensional shape, it is not made to arch or bend to the pole. A gore is comprised of two segments, a top segment (FIG. 6, 46) and a bottom segment (FIG. 6, 47).

Segment: A segment is one of multiple extensions that extend predominantly upwards or downwards in an outward direction away from the equator of the sheet (FIG. 2, 99) (FIG. 6, 46). A segment may or may not have a hole in its distal region, which may or may not have a drawstring running through it.

Quadrant: Each segment is comprised of two quadrants, the left (FIG. 6, 49) and right (FIG. 6, 50). Thus, a gore with two segments is comprised of four quadrants.

Figure 7:
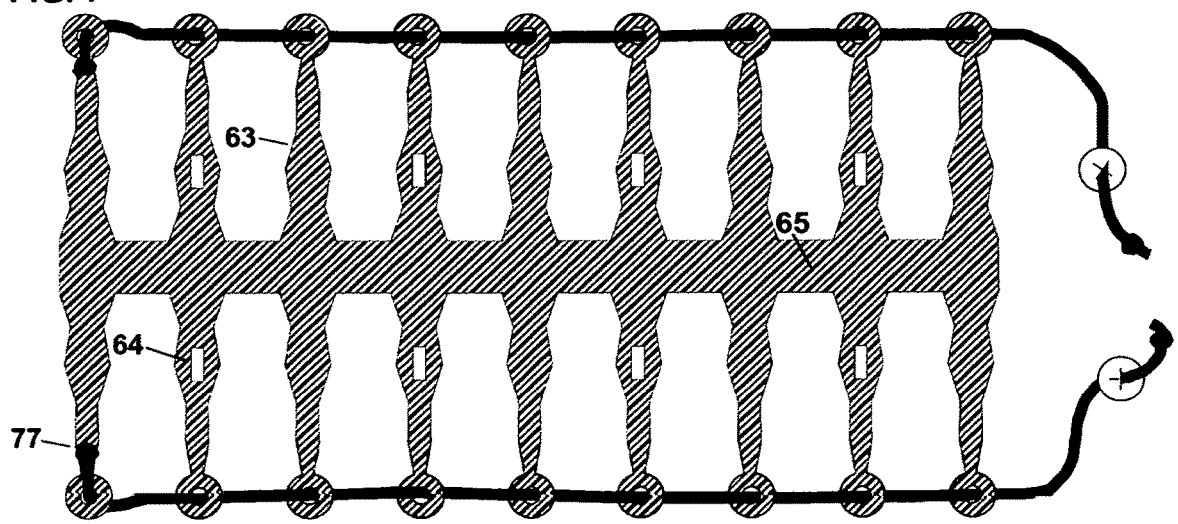
FIG. 7 illustrates when there is a bridge strip between gores, holes that are for purposes other than receiving the drawstring, and irregular edges.

Edge: The outside limit of a quadrant is its edge. The edge of a quadrant can be a curve (FIG. 2, 69), a straight line, or any other conceivable path, irregular or not (FIG. 7, 63). For example, an edge can be cut in a curved line if it will need to curve to become the geodesic between its base and the nearest pole. The edge of one quadrant may or may not abut the edge of its adjacent segment's quadrant once the three dimensional shape is formed. That is because there may be embodiments of this invention where the resulting three dimensional shapes is intended to have at least one gap between at least two of its adjacent segments (FIG. 7).

Edge length: An edge length is the distance between the point where a quadrant is no longer connected to an adjoining segment's quadrant, to the polar hole of that segment (FIG. 2, 100). In a segment, one quadrant's edge length can be the same as the other quadrant's edge length or different.

Segment pole: A segment pole is the area at the distal end of a segment (FIG. 2, 30) that is situated such that, once the three dimensional shape is formed and the segment becomes an arcuate, the segment pole will be situated at a location in the three dimensional shape that approximates that hemisphere pole (FIG. 1, 38). If the segment's pole needs to be arched or bent to reach the three dimensional shape's pole, then the poles have a hole in them (FIG. 2, 30).

Hole: At each segment's pole that is adapted to arch or bend towards the three dimensional shape's pole, a region or space exists with a hole in it (FIG. 5, 43). If the holes are to be situated at the ends of each of the gore's poles, it is difficult to make a hole at such a corner. Thus, an extra amount of space is allotted at each gore's pole (FIG. 5, 44), in order that a hole can be made inside that space (FIG. 5, 45) at a point where the gore's pole is to be situated when the drawstring is pulled. This extra space, which is either to be attached, or to be part of the original cut sheet, can be in any shape, including, but not limited to a circle (FIG. 5, 45), or square, or any other reasonable geometric shape. The hole need not be situated exactly at the center of the extra added space. It can be off center to achieve adjustments and variations in the resulting three dimensional shape. This hole is at least a sufficient diameter (FIG. 5, 45) as to let the drawstring move through it. The hole can be closed off on all sides (FIG. 5, 44), requiring the drawstring to be threaded through it. Or, there can be a slit or opening on one side (FIG. 5, 74) of the hole. In the latter embodiment, the drawstring can be pushed through the slit into the hole, not threaded.

Hemisphere segment series: A hemisphere segment series is all of the segments that will become one hemisphere of the three dimensional shape. The apparatus of this invention can be comprised of two hemisphere segment series, such that they will form into a three dimensional shape that has two poles (FIG. 13).

Three dimensional shape's pole: a three dimensional shape's pole is the point at which a hemisphere segment series' segments' poles come together once the drawstring is pulled to brings them together (FIG. 1, 38).

Axis: The axis of the formed three dimensional shape is the imaginary line that runs through the two three dimensional shape's poles. The drawstring generally runs through or near the axis (FIG. 1, 82).

Bridge strip: A bridge strip is a bridge that connects two adjacent gores when those gores do not abut each other (FIG. 7, 65).

Sheet: A sheet is comprised of all the surfaces in this apparatus that are connected to each other (FIG. 2). It includes, but is not limited to the gores, segments, flaps, extension tabs, and bridge strips. A sheet can be either flat when at rest, or have a curvature to it. Such curvature includes, but is not limited to the sheet being in a roll form. The width of a sheet is the distance between one of its non-polar sides to the other non-polar side (FIG. 2, 31).

Extension tab: An extension tab is an extension in at least one of the non-polar sides of the apparatus (FIG. 2, 72). This extension can be of any shape and size. Some purposes for the extension tab can include, but are not limited to ornamental reasons, functioning as an interlocking tab and slit, and a notches mechanism of attaching the two non-polar ends of the apparatus together.

Connect: Gores can be connected to each other by many means, including but not limited to the means indicated below: 1. Gores can be cut separately and then attached to their adjacent gores at at least one point (FIG. 2, 32) by means including but not limited to adhesive, sewing, and staples. 2. A belt can be attached to adjacent gores which runs transversely across them. 3. Also, when a sheet is cut out of one continuous surface, then the gores are already created connected together out of one continuous sheet of material.

Drawstring: The drawstring of this apparatus can be of any material, so long as it is durable enough for its function of being pulled in this apparatus and able to be put through the holes (FIG. 3, 81). Examples of the drawstring include, but are not limited to, yarn, thread, wire, and ribbon.

Drawstring securing mechanism: A drawstring securing mechanism is a component of this apparatus which can be used to prevent the three dimensional shape from at least partially resuming its sheet shape. Examples of stoppers include, but are not limited to knots, clips, tabs (FIG. 3, 42), beads, hooks, rubber discs, and recoiling springs. A drawstring securing mechanism can either be created on the apparatus (for example, by making a knot in the drawstring), incorporated as part of apparatus before it is transformed into its three dimensional shape, or put upon it after the three dimensional shape forms. Examples of a stopper's location include, but are not limited to: having the ends of the drawstring threaded through them (FIG. 3, 37), having them clip onto the drawstring, or having the stopper attached or incorporated into the sheet.

Pull: To form the three dimensional sphere, one preferably holds each end of the drawstring in each hand (FIG. 4). Then, one pulls the two ends of the drawstring away from each other. This causes the threaded gores and/or segments to be drawn together. The sheet begins to curl, both vertically and horizontally inward towards the inner face of the sheet. This pulling can continue until at least a partially radial three dimensional shape forms (FIG. 4, 39). Alternatively, one can only pull on one end of drawstring such that it is made to go further away from the sheet. This will similarly result in the segment poles being drawn together to form the three dimensional shape. One can optionally then move, position, or place at least one stopper at at least one three dimensional shape pole to prevent the resulting three dimensional shape from at least partially returning to its sheet form.

Three dimensional shape: The three dimensional shape is the non-planar surface form that the apparatus transforms into once the drawstring(s) is pulled to cause the segment poles with holes in them to be drawn closer together, for example FIG. 1. The segment poles may be drawn together to the point where their holes overlap one another (FIG. 1), or they may be drawn closer together partially, as the design and desired shape of the three dimensional shape dictates.

Partially radial: Partially radial is defined as the least three dimensional shape that results when the drawstring is pulled. This means that the pulling of the drawstring causes the gores and/or segments of the apparatus to curl around as their poles are drawn closer together. The first and last gore of the sheet may thus be made to meet (FIG. 1), or they may be made to go around only partially.

Figure 9:
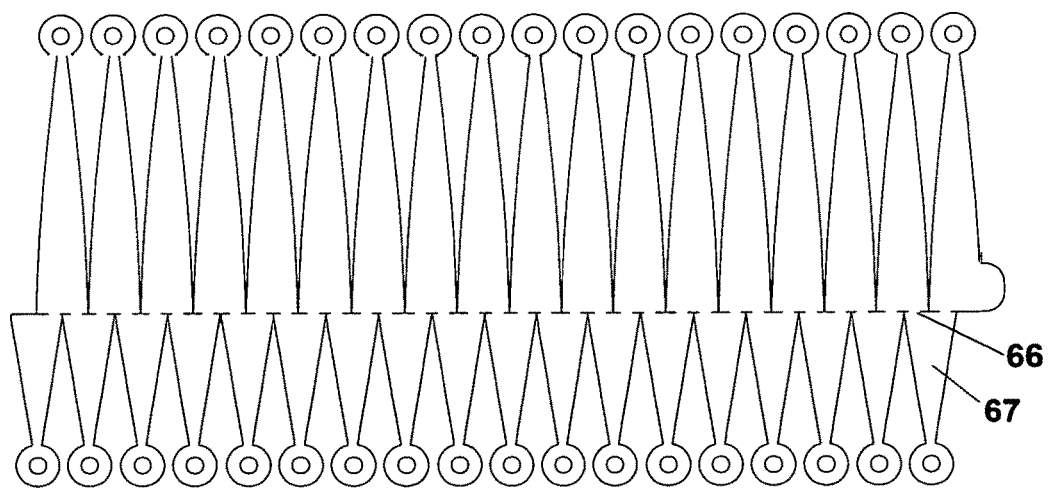
FIG. 9 illustrates the cut of the sheet which, when threaded and pulled, will transform into the bell shape three dimensional shape of FIG. 8. It also demonstrates an example of where a means of folding like scoring lines are used to achieve the fold needed in the bell shape.

Means of bending: A means of bending is a modification made in any portion of the sheet to enable it to bend, rather than just arch, at that location (FIG. 9, 66). Such means include, but are not limited to scoring lines, perforation, or cutting in the sheet material. When a sheet is adapted to have a means of bending, this means that it could either have these modifications made to it in at least one location, or it could simply be a sheet that is inherently flexible and capable of being bent if so desired.

Cut: The cutting of the sheet can be achieved in many different ways. Some means of cutting the sheet include, but are not limited to, blades or scissors, cutting plotters, laser cutters, or die cutters.

Light source: A light source is any object that can emit light, including but is not limited to an incandescent light bulb (FIG. 11, 87), an LED, fluorescent light, or a candle.

Variations

All embodiments of this apparatus can be manufactured such that the drawstring is threaded through the sheet to become an integral part of the apparatus. Or they can be manufactured such that the drawstring will be threaded through the sheet at a later point in time. The latter can occur, for example, if the apparatus is being marketed as a craft kit.

Both faces of the sheet can uniformly be made to have the same color and/or texture, or one face can be made to have uniformly a different color and/or texture than the other face. Alternatively, color and/or texture can be applied selectively to at least one portion of the sheet on at least one of its faces, such application including, but not limited to printing, foil stamping, varnishing, embossing, painting, and drawing an image.

In one different embodiment of this invention, the first and last gore in the sheet are also connected to each other, thereby forming a continuous loop of gores. Thus, the pulling of the drawstring would cause the segments' poles to be drawn together, not the first and last gore, which would already be connected.

If all gores are identical to each other, then the resulting three dimensional shape is radially symmetrical. However, if all gores are not identical to each other, such that at least one segment is different in shape and/or size, then the resulting three dimensional shape is not radially symmetrical. For instance, at least one segment can be at least one of the following: wider, thinner, slanted, having a different edge, being shorter, being taller relative to its adjacent gores. The latter would result in that segment protruding more from the formed three dimensional shape than its adjacent sectors. This can result in complex, non-radially symmetrical three dimensional shapes.

In addition, another way that segments can vary from one another is when at least one segment on a sheet has a quadrant's edge length (FIG. 2, 100) that is longer than the segment's other quadrant's edge length (FIG. 2, 101). This can happen if the point where the quadrant is no longer connected to an adjoining quadrant is higher or lower longitudinally than the point where the opposite quadrant no longer connects to its other adjoining segment's quadrant. It can also cause that segment to be slanted such that it is not extending perpendicularly away from the imaginary line that runs parallel to the width of the sheet (FIG. 2, 99), but rather at an oblique angle. This can be done for various reasons. For example, it can serve to minimize gaps that form in between gores of different lengths when the three dimensional form is created, or in order to make the edge length of one quadrant of a segment be as close as possible to the edge length of its adjacent gore's quadrant. A segment's two quadrant's edge lengths can also be different simply to make the segment skewed in the formed three dimensional shape.

Similarly, many different three dimensional shapes can be created even if all gores and/or segments are identical to each other and the three dimensional shape is radially symmetrical. This can be achieved by uniformly changing the length and shape of the top and bottom segments. For instance, a tall oval egg like shape can be created by uniformly elongating all the gores and/or segments. A flatter, disk like shape can be created by added more gores and/or segments, increasing the width of gores and/or segments, or making them shorter. If a teardrop three dimensional shape is being created, the segments of the gores that correspond to the bottom of the teardrop will have arched edges similar to that of the sphere's segments in order to form a half sphere. But the segments of the gores that correspond to the top of the teardrop will be of a more elongated and triangular shape, in order to form a tall cone on top of the three dimensional teardrop shape.

Alternatively, segments need not have straight line or arc edges. Rather, the segment's quadrants can have irregular shape edges (FIG. 7, 63). This includes, but is not limited to jagged like sides that can optionally fit together when the three dimensional shape is formed. All edges of adjacent segments need not abut, and gaps need not be filled by the formation of the three dimensional shape. In addition, one or multiple holes can also be added to the sheet (FIG. 7, 64) that are not polar holes, so that the resulting three dimensional shape may have at least one hole in it. Reasons for doing this can include, but are not limited to the holes being ornamental and allowing light emitted from the interior of the three dimensional shape (in the light embodiment) to pass through the hole.

Also, the gores do not have to be directly adjacent to each other at the point where they connect. There could be a bridge strip (FIG. 7, 65) that connects them while putting a distance between the gores. There can be one or more of such bridge strips per sheet.

Arching of the flexible sheet need not be the only means of deforming it into its three dimensional shape. At least one means of bending can also be incorporated into at least one point of the sheet to enable at least one point of the resulting three dimensional shape to form not by the arching of the sheet at that area, but at least partially by bending of the sheet (FIG. 9, 66). Such means of bending including, but not limited to scoring lines, perforation and cutting in the sheet material.

Such means of bending can also aid in the formation of facets in the resulting three dimensional shape. By precluding any cuts to run through a facet's area on a sheet, a flat facet can be made to form in the resulting three dimensional shape (FIG. 1, 88). The segments and areas of the sheet that fall outside of the facet area can be adapted to accommodate the facet.

Figure 14:
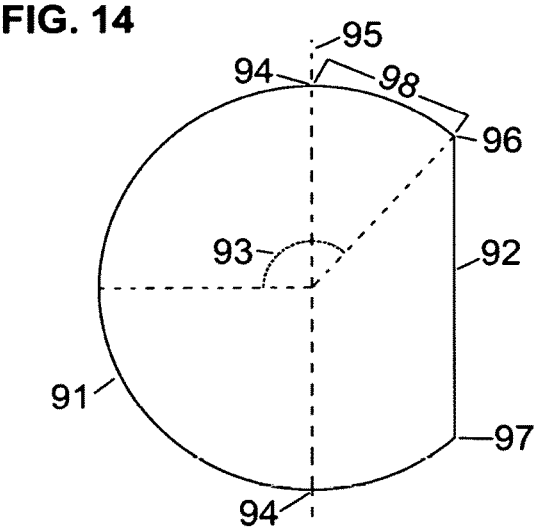
FIG. 14 illustrates a side cross section of FIG. 1.

FIG. 1 is one such embodiment of this invention. FIG. 1 is a spheroidal cap with a flat plane section, and FIG. 14 is a cross section view of this spheroidal cap. Numerous segments emerge from the top (FIG. 14, 96) and bottom (FIG. 14, 97) of its plane section. The length of each of those segment's two sides (FIG. 2, 100) and (FIG. 2, 101) needs to be the length of a geodesic between the plane section and the pole that it extends to in the formed 3D spheroidal cap, in order for the plane section to remain flat in the resulting transformed spheroidal cap (FIG. 14, 91). FIG. 14, 98 is an example of one such geodesic. In addition, in order for the plane section to become flat and for each of the segments' sides to be the above stated geodesic length, each of the segments extending out from the plane section needs to slant more and more medially, the more distally they are located from the median of the plane section (FIG. 2, 99).

The formed spheroidal cap shape must have a cap angle greater than 90 degrees (FIG. 14, 93), because, by definition, a spheroidal cap that has a cap angle that is less than 90 degrees could not have poles (FIG. 14, 94) as are drawn in FIG. 1. It is preferable that the plane section (FIG. 1, 88) and (FIG. 14, 92) is approximately parallel to the spheroidal cap's axis (FIG. 14, 95).

In an alternative embodiment, the entire sheet can be designed to be comprised of facets if many means of bending are incorporated into it.

Figure 8:
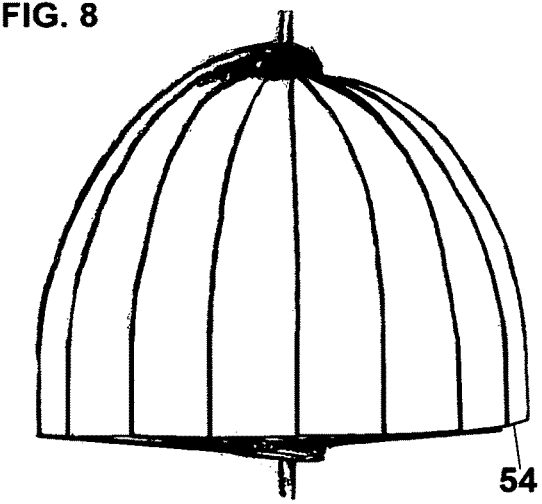
FIG. 8 illustrates a three dimensional bell shape that is created from an apparatus with two hemisphere segment series, like the one in FIG. 9.
Figure 10:
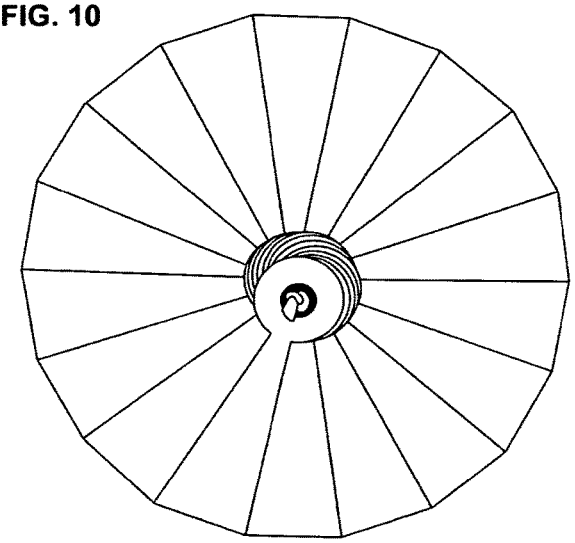
FIG. 10 illustrates a polar view of a sample staggered three dimensional shape.

Alternatively, a bell like three dimensional shape (FIG. 8) can be created by having the line which connects the points at the bottom segments where the segments are no longer connected to each other (FIG. 9, 66) be scored to readily bend inward. In addition, the segments that correspond to the bottom of the bell (FIG. 9, 67), after the bottom rim of the bell (FIG. 8, 68), are to be cut in a straight triangular way and angle, such that, when the poles are pulled together, they approximate a cut up pie surface (FIG. 10).

The shape of the segments determines the resulting shape of the three dimensional shape. If a spherical three dimensional shape is being created (FIG. 1), then the gores will taper in an arc to the poles (FIG. 2, 69). If a cone like three dimensional shape is desired, then the segments will taper linearly to the poles. The width and number of gores also determines the outcome of the three dimensional shape. The width of each gore (FIG. 2, 70) corresponds to the arc length of the corresponding region of the resulting three dimensional shape (FIG. 1, 71). For instance, in creating a gores globe, the number and width of the segments must be such that they at least total the sphere's circumference (FIG. 2, 31). Additional extensions (FIG. 2, 72) to the non-polar sides of the sheet can be incorporated into the sheet if a degree of overlap is desired in the resulting three dimensional shape (FIG. 1). For example, a tab in the first gore and a corresponding hole for the tab in the last gore can be incorporated into the sheet which will attach the first and last gores to each other. Alternatively, an excess of gores will cause the resulting three dimensional shape to have at least part of at least one lateral gores to overlap the opposite lateral gore.

Alternatively, the sheet can have a width (FIG. 2, 31) that is narrower than the circumference of the resulting three dimensional shape, resulting in a partially radial three dimensional shape. It is not necessary for the gores to be pulled completely around for the last gore to meet the first gore. For example, in one embodiment, if a half sphere three dimensional shape is being created, then half as many gores will comprise the sheet, and when pulled together, will form a half sphere.

Figure 11:
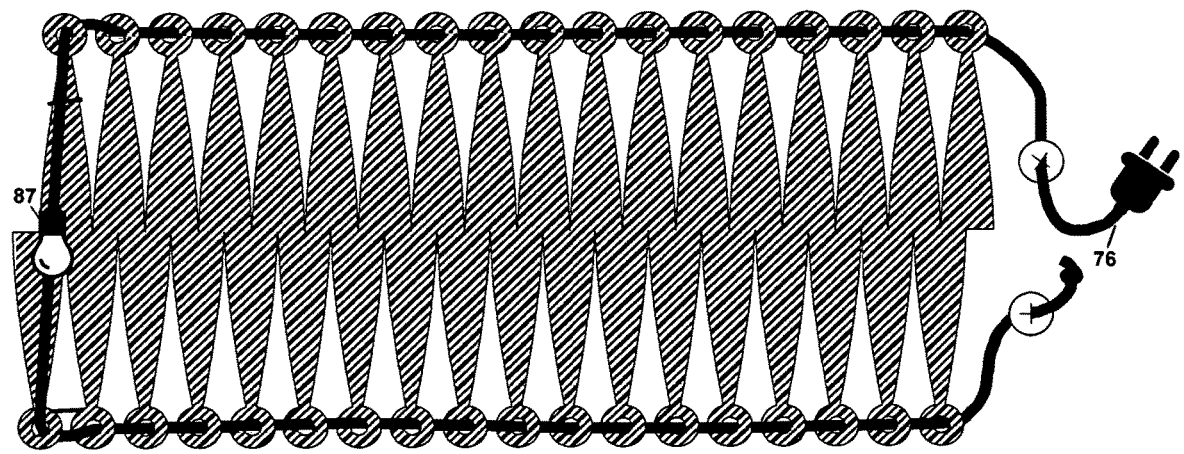
FIG. 11 illustrates the embodiment where a light source is incorporated into the apparatus, and where an electric cord is replacing the drawstring in the region of the top hemisphere.

In another embodiment, the drawstring can have either attached to it or incorporated into it any light source, including, but not limited to a lantern, candle, or light bulb (FIG. 11). Such a light source can be either incorporated into the manufacturing of the drawstring product, or added or attached to the product at a later stage, thus making the product into a lighting fixture or lamp. If the light source is incorporated into the drawstring, it would be preferably positioned at the region of the first gore where the drawstring will be running up the inside face of the sheet (FIG. 3, 75) so that, in the resulting three dimensional shape, the light source will becomes positioned somewhere along the interior axis of the three dimensional shape. If the light source is not a stand-alone, and requires an external electrical source, then one side of the drawstring going away from the light source can be, or have incorporated into it, an electric wire which runs through all that hemisphere's segments' holes and can be connected to an electric source (FIG. 11, 76). Thus, when the drawstring is pulled from both sides, the resulting three dimensional shape will have the light source positioned at a point inside it.

Alternatively, any object, not just a light source, can be attached or incorporated into any area of the apparatus that can become situated inside the resulting three dimensional shape. This object can be attached to the part of the drawstring that becomes situated inside the resulting three dimensional shape, or it can be attached to any other part of the apparatus such that the object can then become situated on the interior of the resulting three dimensional shape. The object can even be attached after the three dimensional shape is formed. One possible example of when this would be done is when the three dimensional shape's material is transparent, and a decorative object like a jewel is suspended from the interior of the three dimensional shape.

Figure 12:
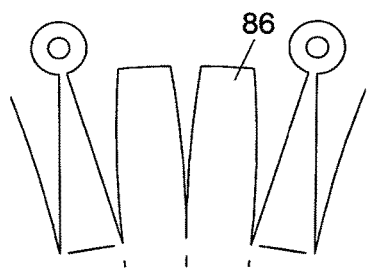
FIG. 12 illustrates an embodiment where multiple segments do not have polar holes in them.

In an alternative embodiment, at least one segment will not be threaded by the drawstring (FIG. 12, 86), causing it to remain relatively flat and thus distal to its formed three dimensional shape's corresponding hemisphere's pole, and to sticking out relative to other segments once the drawstring is pulled and draws the other threaded segments to the center. This can result in complex three dimensional shapes.

Figure 15:
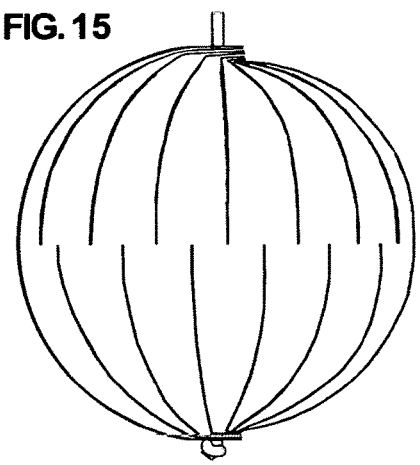
FIG. 15 illustrates what FIG. 13 look like when transformed into a three dimensional shape.

Alternatively, a segment need not be reflectively symmetrical with its opposite pole counterpart segment, such that it sits directly above its corresponding lower gore panel. Instead, segments can be cut to be staggered relative to segments of the opposite hemisphere (FIG. 13). FIG. 15 is the three dimensional shape that forms from FIG. 13. This process can eliminate the need for a connection region between adjacent segments (FIG. 2, 32), since the staggering of segments alone connect them together.

In addition, at least one means of bending can be incorporated into the apparatus in at least one point of the sheet to enable at least one point of the resulting three dimensional shape to form not by the arching of the sheet at that area, but at least partially by bending of the sheet. Such means of bending can include, but are not limited to scoring lines, perforation and cutting in the sheet material (FIG. 9, 66). Such means of bending can cause facets to form in the resulting three dimensional shape.

In an alternative embodiment, one pole's drawstring can be detached and independent from the other pole's drawstring. In this case, instead of being connected to each other, each hemisphere's drawstring will have a drawstring securing mechanism at the point before entering the hole of the first segment, to prevent the drawstring from being unthreaded once pulled. This will result in there being no drawstring running through the axis of the resulting three dimensional shape.

Alternatively, the drawstring for one hemisphere can remain connected to the drawstring of the opposite hemisphere, but it will be threaded such that, when the three dimensional shape forms, the portion of the drawstring that runs between the two hemispheres is located on the outside of the three dimensional shape instead of running down its interior axis. In this embodiment, the two ends of the drawstring will become situated on the inside of the resulting three dimensional shape, not the exterior. To achieve this, at least one drawstring securing mechanism will need to be incorporated into the apparatus for each of the drawstring's ends to prevent either end of the drawstring from being pulled out of its respective polar holes once the drawstring is pulled.

An alternative way to have the ends of the drawstring become situated on the inside of the three dimensional shape, and the part of the drawstring which runs between the two hemispheres being on the outside is simply to take the originally described embodiment of FIG. 3 and turn it inside out. This could be accomplished by tying the two ends of the drawstring together (or otherwise attaching them), forming a drawstring loop, and pulling on the drawstring running up the first gore (FIG. 3, 75). This would particularly be useful when the inside face of the sheet (FIG. 2, 26) is of a different color or texture than the outside face of the sheet (FIG. 2, 27).

Another embodiment of this invention is when at least one segment does not end at its polar hole region, but rather continues on. For instance, if a flap is incorporated past the hole (distal from the sheet) for each segment of all the segments corresponding to one pole of the formed three dimensional shape, then, when the drawstring is pulled, a shape roughly resembling a pineapple will form.

Alternatively, the sheet can be made such that the resulting three dimensional shape has multiple stories or levels. For instance, the flaps described in the above paragraph can be adapted to have the shapes of gores with holes at their distal polar region. Then, the drawstring can be threaded through the holes of those distal poles such that, when pulled, the internal face of the bottom region of the sheet will now form the outer face of the upper region of the resulting three dimensional shape. The resulting three dimensional shape, which can have a plurality of such levels, can all have each level having its axis with the drawstring running through it. If the sheet is made such that the circumference of the additional level's resulting three dimensional shape is different from the circumference of the original three dimensional shape, then the gores of the new level cannot be connected to each other.

An alternative embodiment of this invention is when the poles of one of the two hemispheres are situated at the center of the sheet, and all of the gores radiate out from that central polar region like flower petals. In this embodiment, there would be a hole at the distal end of a plurality of the gores. The drawstring is threaded sequentially around through the polar holes that form the perimeter of the sheet. Both ends of the drawstring preferably have a drawstring securing mechanism to prevent the stitching form becoming undone. When the drawstring is pulled, like a drawstring purse, all the poles of the gores come together to form the three dimensional shape. The imaginary planes that run across those polar holes is also made to at least approach stacking on top of each other. The drawstring for this embodiment can be part of the apparatus, or it can be added in the above stated manner at a later point in time.

Most of the above embodiments have described sheets where the gores are serially connected to each other at their widest transverse area (FIG. 2, 70). This generally results in the gores lining up next to each other linearly. An alternative embodiment however is one between the above stated flower like embodiment and the original linearly adjacent gores embodiment (FIG. 3). In this embodiment, the gores are not linearly connected to each other but at an arc. This results when gores are connected to each other at a transverse point that is narrower than their widest transverse area.

PREFERRED EMBODIMENT

In the preferred embodiment of this invention, one rigid sheet of plastic, roughly one tenth of a millimeter thick, is cut in the following way: There is a plane section that has multiple segments extending upwards and downwards away from it (FIG. 2). Both of the plane section's two sides are adjoined to identical tapered and arced gores that are connected to each other at their widest point (FIG. 2). At the tapered pole of each segment, there is a disc (FIG. 5, 44) with a hole in the middle, the center of this hole being situated where the segment's pole would be. At the first gore (FIG. 3, 33), where the drawstring will be running up the inside face of it (FIG. 3, 75), in the center edge, a tab is incorporated into the design (FIG. 2, 72), to be tucked under the last gore when the first and last gore meet (FIG. 4, 39) in the three dimensional sphere (FIG. 1). In addition, two tab stoppers are designed, the same size as the discs located at each gore's poles. These discs have a small cross slit cut into the center of them (FIG. 3, 42). They are to serve as the drawstring securing mechanisms for the three dimensional shape (FIG. 1, 80). This design is then cut by a plotter cutter.

A ribbon which is roughly two thirds the width of the holes' diameter (FIG. 3, 81) is cut to be roughly three times longer than the width of the sheet. One end of the ribbon is knotted. The other end is threaded through a large needle's eye. The needle and thread are threaded through one of the stopper discs. Then the ribbon is threaded through the bottom last hole (FIG. 3, 36) from the outer face to the inner face, and all subsequent bottom holes from the outside face to the inside face. When the hole of the bottom segment of the first gore (FIG. 3, 34) is threaded, the ribbon is run up the inside face of the first gore (FIG. 3, 75), and threaded through the top segment going from the inside outward. All of the other remaining top segments are threaded from the inside face to the outside face. When the last segment has been threaded, the other stopper disk is threaded, the ribbon is removed from the needle, and a knot tied at the end of the ribbon.

To form the three dimensional shape, one holds one end of the drawstring ribbon in each hand (FIG. 4). One then pulls the two drawstring ends away from each other. By doing so, the sheet begins to curl, both vertically and horizontally inward towards the inner face of the sheet. When the last and first gores reach each other (FIG. 4, 39), one tucks the tab under the last gore. One positions the stopper tabs now in position to prevent the resulting three dimensional shape from unrolling.

I claim:

1. An apparatus comprised of a pre-cut flat flexible sheet that can be transformed to approximate a three dimensional spheroidal cap shape with a cap angle greater than 90 degrees and its approximately flat plane section,
    where the spheroidal cap shape has two poles and one axis,
    such that the spheroidal cap's axis runs approximately parallel to the plane section, and the plane section has a top and bottom, and two left and right sides,
    where the tangents to the two sides run approximately parallel to the spheroidal cap's axis;
    whereby the pre-cut flat flexible sheet is cut to be comprised of:
        a plane section and a plurality of segments that extend predominantly away from the top and bottom of the plane section such that, each of the segment's two sides is cut to approximately be the length of a geodesic between the plane section and the nearest pole of the spheroidal cap that forms;
        and the region where the segments adjoin the plane section are adapted to have a means of bending;
        and at least one of the plane section's two sides are adjoined to a plurality of gores that are serially connected to each other at their lateral adjoining edges;
        and a plurality of the gores and segments have a hole in at least near their segment pole such that the holes of the plurality of segments are adapted to receive at least one drawstring that is sequentially and unidirectionally made to run through a plurality of the holes of the plurality of gores and segments such that, when the drawstring is pulled, the segment poles that have the drawstring running through their holes will be drawn together and cause the immediate planar region where the holes are located to at least approach stacking on top of each other, and cause a spheroidal cap shape to form.

2. The apparatus of claim 1 wherein a drawstring is threaded through the sheet's segment's holes in the following manner, but following any order of threading:
    i. at either of the terminal gores of the sheet, the drawstring runs longitudinally up and down the inner face of that gore towards the two polar holes;
    ii. the two opposite ends of the drawstring are threaded from the inner face towards the outer face of each of the two polar holes;
    iii. for each of the two hemisphere segment series, the drawstring continues to be threaded serially through the polar hole of the adjacent segment, always entering from the inner face side of the hole, and exiting on the outer face side of the hole, until all the polar holes that require threading on each hemisphere segment series have been threaded, and the drawstring's two ends are now situated at the sheet's opposite terminal gore's two poles, such that;
    iv. when the drawstring ends are pulled and the three dimensional shape forms, the drawstring runs substantially through the axis of the formed spheroidal cap shape.

3. The apparatus of claim 1 wherein the left and right edges of the sheet are also connected to each other, thereby forming a continuous loop.

4. The apparatus of claim 1 further comprising a drawstring running through a plurality of the segment holes, and at least one drawstring securing mechanism, which is adapted to prevent the three dimensional shape from at least partially resuming its sheet shape after the three dimensional shape has formed, is disposed on the drawstring.

5. The apparatus of claim 1 wherein there are at least two drawstrings such that:
    i. there is at least one drawstring per hemisphere segment series;
    ii. the drawstring of one hemisphere segment series is separate from the drawstring of the opposite hemisphere segment series;
    iii. for each of the drawstrings' ends that will become situated on the inside of the three dimensional shape, at least one drawstring securing mechanism is incorporated to prevent either of the two hemisphere's drawstrings from being pulled out of their respective polar holes once the drawstrings are pulled.

6. The apparatus of claim 1 wherein at least one object that has a body sized as to fit inside the radial three dimensional shape is incorporated into the apparatus such as to have the object situated on the interior of the resulting three dimensional shape, by means including:
   i. attaching the object to the part of the drawstring that becomes situated inside the resulting three dimensional shape; or
   ii. attaching the object to any other part of the apparatus such that the object can then become situated on the interior of the resulting three dimensional shape; or
   iii. attaching the object after the three dimensional shape is formed.

7. The apparatus of claim 1 wherein the sheet is adapted to be wider than the circumference of the resulting three dimensional shape in at least one of the following ways:
   i. at least one extension tab existing on at least one of the terminal gores; and
   ii. at least one lateral gore is made to overlap the opposite lateral gore in the resulting three dimensional shape.

8. The apparatus of claim 1 wherein at least two adjacent segments do not abut, but rather are connected to each other by a bridge strip.

9. An apparatus comprised of a flexible flat sheet comprised of
   a top row of segments extending predominantly upwards and
   a bottom row of segments extending predominantly downward,
   where each segment has a distal pole and a proximal region relative to the flexible flat sheet, and
   these two rows of segments are not reflectively symmetrically situated opposite each other, but are rather staggered, such that adjacent segments are connected to each other by both having a portion of their proximal region connected to an opposite row's segment's proximal region; and
   where a plurality of the segments of the two rows of segments have a hole in at least near their segment pole such that;
   the holes of the plurality of segments are adapted to receive at least one drawstring that is sequentially and unidirectionally made to run through a plurality of holes of the plurality of segments such that,
   when the drawstring is pulled, the segment poles that have the drawstring running through their holes will be drawn together and cause the immediate planar region where the holes are located to at least approach stacking on top of each other, and cause an at least partially radial three dimensional shape to form.

10. The apparatus of claim 9 wherein a drawstring is threaded through the sheet's segment's holes in the following manner, but following any order of threading:
    i. at either of the terminal segments of the sheet, the drawstring runs longitudinally up and down the inner face of those terminal segments towards the two their polar holes;
    ii. the two opposite ends of the drawstring are threaded from the inner face towards the outer face of each of those two polar holes;
    iii. for each of the two hemisphere segment series, the drawstring continues to be threaded serially through the polar hole of the adjacent segment, always entering from the inner face side of the hole, and exiting on the outer face side of the hole, until all the polar holes that require threading on each hemisphere segment series have been threaded, and the drawstring's two ends are now situated at the sheet's opposite terminal segments' two poles, such that;
    iv. when the drawstring ends are pulled and the three dimensional shape forms, the drawstring runs substantially through the axis of the formed three dimensional shape.

11. The apparatus of claim 9 wherein the left and right edges in the sheet are also connected to each other, thereby forming a continuous loop.

12. The apparatus of claim 9 further comprising a drawstring running through a plurality of the segment holes, and at least one drawstring securing mechanism, which is adapted to prevent the three dimensional shape from at least partially resuming its sheet shape after the three dimensional shape has formed, is disposed on the drawstring.

13. The apparatus of claim 9 wherein at least one segment has one quadrant's edge length being longer than the segment's other quadrant's edge length, causing at least one segment to be slanted such that it is not extending perpendicularly upward or downward away from the sheet, but rather at an oblique angle.

14. The apparatus of claim 9 wherein at least one segment has at least one irregular shape edge.

15. The apparatus of claim 9 further comprising a drawstring running through a plurality of the segment holes, at least one segment not threaded by the drawstring, causing it to remain relatively flat and thus distal to its formed three dimensional shape's corresponding hemisphere's pole, relative to other threaded segments, once the drawstring pulls the other threaded segments' poles towards their corresponding hemisphere's pole to form the three dimensional shape.

16. The apparatus of claim 9 wherein there are at least two drawstrings such that:
    i. there is at least one drawstring per row of segments;
    ii. the drawstring of one row of segments is separate from the drawstring of the opposite row of segments;
    iii. for each of the drawstrings' ends that will become situated on the inside of the three dimensional shape, at least one drawstring securing mechanism is incorporated to prevent either of the two rows' drawstrings from being pulled out of their respective polar holes once the drawstrings are pulled.

17. The apparatus of claim 9 wherein at least one object that has a body sized as to fit inside the radial three dimensional shape is incorporated into the apparatus such as to have the object situated on the interior of the resulting three dimensional shape, by means including:
    i. attaching the object to the part of the drawstring that becomes situated inside the resulting three dimensional shape; or
    ii. attaching the object to any other part of the apparatus such that the object can then become situated on the interior of the resulting three dimensional shape; or
    iii. attaching the object after the three dimensional shape is formed.

18. The apparatus of claim 9 wherein at least one means of bending exists in at least one point of the sheet to enable at least one point of the resulting three dimensional shape to form not by the arching of the sheet at that area, but at least partially by bending of the sheet; such means including scoring lines, perforation or cutting in the sheet material.

19. The apparatus of claim 9 wherein at least one area of the sheet is adapted to become a substantially flat facet in the resulting three dimensional shape by precluding any cuts to run through that facet's area, where said cuts would otherwise have enable the sheet in that area to do at least one of the following: arch and bend once the drawstring is pulled.

20. The apparatus of claim 9 wherein the sheet is adapted to be wider than the circumference of the resulting three dimensional shape in at least one of the following ways:
   i. at least one extension tab existing on at least one of the terminal segment; and
   ii. at least one lateral segment is made to overlap the opposite lateral segment in the resulting three dimensional shape.

* * * * *